June 28, 1966     R. DI PASQUALE ETAL     3,258,366
SEA-WATER BATTERY HAVING IMPROVED ELECTRODE
MARGINAL INSULATION
Filed Jan. 30, 1962     3 Sheets-Sheet 1

INVENTORS:
RENATO DI PASQUALE
GEORGE ABBE DALIN
BY
Irving Holtzman
ATTORNEY.

INVENTORS:
RENATO DI PASQUALE
GEORGE ABBE DALIN
BY

ATTORNEY.

VOLTAGE CURVES OF THREE 10 CELL TEST BATTERIES, DISCHARGED THROUGH RESISTANCE LOAD OF .0345 OHM.

----- PRIOR CONSTRUCTION (III)
——— CUT BACK CONSTRUCTION (IV)

United States Patent Office 3,258,366
Patented June 28, 1966

3,258,366
SEA-WATER BATTERY HAVING IMPROVED
ELECTRODE MARGINAL INSULATION
Renato di Pasquale, Rutherford, and George Abbe Dalin, Union, N.J., assignors to Yardney International Corp., New York, N.Y., a corporation of New York
Filed Jan. 30, 1962, Ser. No. 169,790
2 Claims. (Cl. 136—100)

This invention relates to sea-water batteries, and more particularly, to sea-water batteries of the general type disclosed in U.S. Patent No. 2,988,587.

In test discharging sea-water batteries of this general character, it was found that the battery fell short of the expected capacity by approximately 25%. It was further noted during discharge that at the end of approximately 7.5 minutes, the voltage and the current started to drop off rapidly and to fluctuate.

It is accordingly a principal object of the present invention to provide a sea-water battery of the type under consideration having structural features and relationships which avoid the above described disadvantages.

Other and more detailed objects of the present invention will be apparent from the following description and attached drawings wherein.

Figure 2:
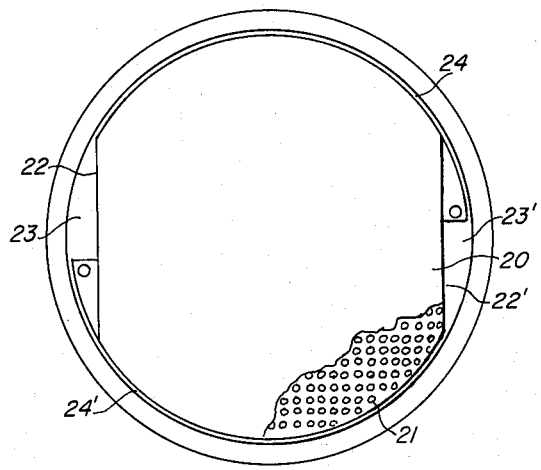
FIG. 2 is a cross-sectional view taken along line II—II of FIG. 1.

As pointed out in U.S. Patent No. 2,988,587, each cell of the battery of this character is made up of a thin anode sheet of magnesium or predominantly magnesium alloy spaced from a thin cathode sheet consisting of silver chloride and a current-collecting skeleton or surface of porous reduced metallic silver. The anode and cathode sheets are spaced from one another by small glass spheres embedded in the cathode sheets and possessing a diameter greater than the thickness of the cathode sheet. The battery is made of a pile of these individual cells in which the cathode sheet of one cell is spaced from the anode sheet of the succeeding cell by a foil barrier which prevents electrochemical interaction between these two members.

The foil barrier referred to above is preferably metallic so that it may conduct current directly between the electrodes of adjacent cells although obviously it may be formed on an insulating material if some other means is employed for electrically connecting the cells. The most suitable material has been found to be silver foil as thin as can be produced commercially in a smooth and non-porous form. Foil having a thickness of 0.0005 to 0.001 inch has been found satisfactory.

When this battery is immersed in a suitable electrolyte such as sea water, the electrolyte circulates in the space formed by the glass beads and causes each cell to function. Since the cells described are intended to operate at high current densities, continuous circulation of electrolyte is necessary to carry away generated heat and to carry away magnesium compounds formed in the electrolyte which may tend to deposit upon the anodes in an insoluble, non-conductive form.

In order to avoid undue resistance loss in the electrolyte, it is advantageous to keep the spacing between electrodes that are occupied by the glass beads at a minimum. For the battery under consideration, a space of the order of 15 mils has been found to be desirable. In view of the proximity of what are usually relatively large electrode surfaces of opposite polarity and the danger of their bending at their marginal edges, it has been proposed to tape the marginal edges of the Mg and silver foil together with insulating tape.

However, as noted above, during the discharge of batteries of this character, it was found that it fell short of the expected capacity and that at the end of about 7.5 minutes, the voltage and current were erratic. When the batteries were dissected, it was observed that one cell in each battery was completely caked with sludge. Moreover, careful examination of the reminder of the cells in each battery showed that some sludge was deposited against the edge of the insulating tape at the exit end of each cell. The quantities of deposit varied from essentially negligible up to the aforementioned complete caking.

Such caking would decrease the flow of water; the magnesium electrodes would begin to polarize, thus decreasing the individual cell voltages. Finally, with complete caking, the electrolyte would be substantially displaced from the cell and the cell resistance would rise.

The origin of the sludge is evident; during the discharge magnesium reacts to form salts of limited solubility which therefore dissolve only partly. Moreover, metallic magnesium reacts with water to form magnesium hydroxide which is almost completely insoluble. The edge of the tape apparently constitutes a barrier against which the sludge might pile up. However, this barrier is only .002 inch high, and is evidently not high enough to interfere with removal of sludge as will be apparent from the discussion below.

Figure 3:
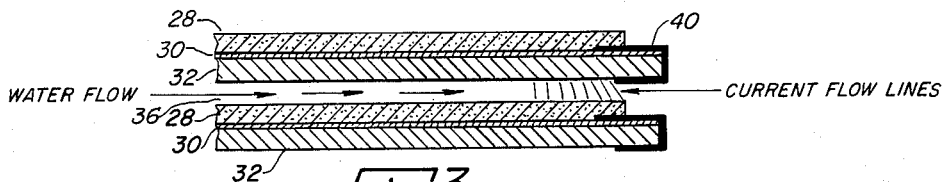
FIG. 3 is a partial cross-sectonal view of an electrode assembly previously employed, the condition of the electrode being shown at the beginning of discharge and the beads being removed from the AgCl plate for clarity.
Figure 3A:
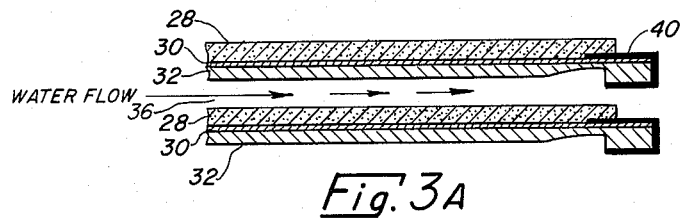
FIG. 3A is same view as FIG. 3 when the condition of the cell is near the conclusion of discharge.

The silver chloride plate in the previously proposed construction extends to a line which is approximately opposite the inner edge of the tape but usually extends slightly beyond this line as shown in FIG. 3. The mechanism by which the barrier is formed is believed to be as follows:

As the discharge proceeds, the magnesium is converted to magnesium chloride and magnesium hydroxide. As these compounds are removed by the stream, the face of the magnesium recedes so that in effect the height of the barrier is increased. In fact, due to the possibility of an increase in current density at the edge of the tape, the magnesium may actually be undercut beneath the tape, thus increasing the effectiveness of the barrier (see FIG. 3).

As a secondary effect, the water stream may also be deflected away from the face of the magnesium plate in the region adjacent to the barrier. Consequently, the supply of new water immediately adjacent to the barrier is cut down thus increasing the tendency for the salts in the process of being formed to precipitate out as sludge and to remain at the point of precipitation.

To overcome this difficulty, it is proposed, according to the present invention, that the barrier, comprised of the edge of the binding tape plus the excavation which results from removal of magnesium during the discharge, be decreased in total height. A preferred method of achieving this end is to displace the silver chloride plate so that the magnesium immediately adjoining the tape is not opposed by silver chloride (see FIG. 4). This method has two benefits. First of all, the two steps presented by the tape edge and by the edge of the region from which magnesium is removed do not coincide. Consequently, the tendency for sludge to lodge against the two steps separately is far less than the tendency to lodge against the two steps combined. When the silver chloride plate extends beyond the edge of the tape, the current density between the plates will be greatest at the edge of the tape as can be seen from FIG. 3.

When the edge of the reaction region is displaced from the tape, as is the case when the silver chloride plate is displaced, the current density at the tape edge will be lower than over the remainder of the plate. As a result, the excavation will tend to be round-edged thus eliminating the tendency for sludge to lodge. We have constructed two batteries with such displaced silver chloride plates. After discharge, the batteries were dissected and examined. There was no deposition of sludge at the edge of the reaction portion and virtually none at the edge of the tape thus demonstrating that the displacement technique is effective.

This also demonstrates that the tape edge alone does not constitute a sufficient impediment to flow to cause pile-up of sludge.

Figure 1:
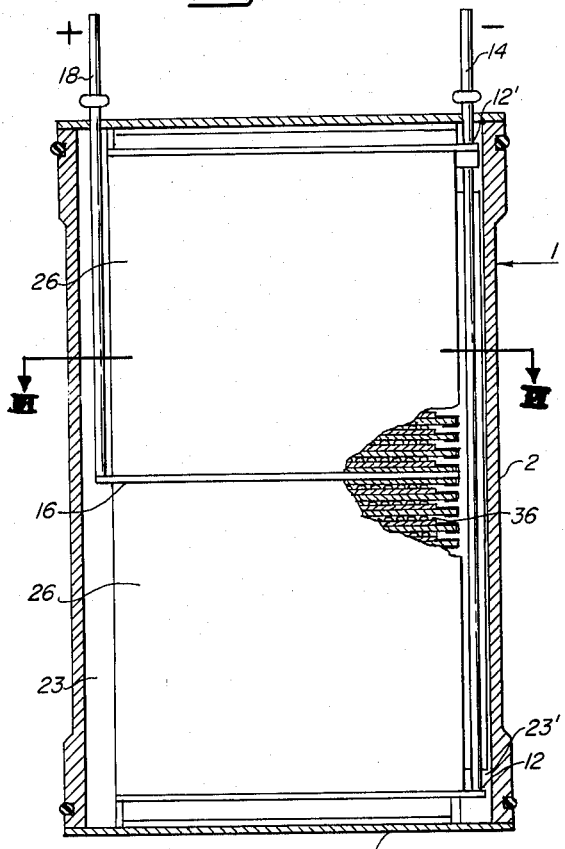
FIG. 1 is a front elevation partly in section showing a sea-water battery embodying features of the present invention.

A sea-water battery in which the present invention is embodied is shown in FIGS. 1 and 2 and comprises a cylindrical housing 2, having an upper removable cover 4 and a lower removable cover 6. When the battery is installed for use, covers 4 and 6 are removed to allow for circulation of sea water through the battery in a manner described in more detail below.

Battery 1 is provided with a pair of negative end plates 12 and 12' disposed at opposite ends of the battery which are electrically connected to each other by means of negative bus bar 14. A single positive plate 16 is disposed intermediate the negative plates 12 and 12' and is electrically connected to positive bus bar 18.

Battery 1 contains a plurality of battery electrode plates 20, described in more detail below, each having a pair of straight edges 22 and 22' and a pair of curved edges 24 and 24'. In the form of the invention illustrated in FIG. 1, potting compound 26 is used to coat the curved edges of the battery plates whereas the straight edges 22 and 22' and the space between the plates at this point is kept open to allow for free circulation of sea water between the plates. The potting compound 26 serves to secure the battery plates 20 in position to the inner wall cylindrical housing 2. Straight edges 22 and 22' are spaced inwardly from housing 2 and collectively form vertical channels 23 and 23' through which sea water may circulate.

Figure 4:
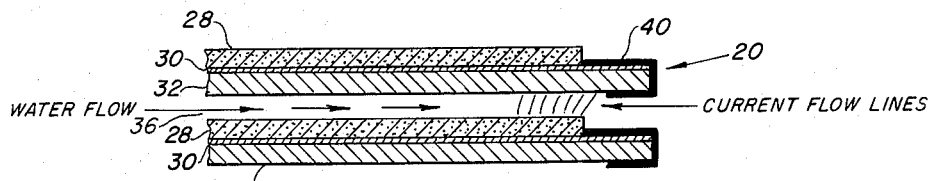
FIG. 4 is a partial cross-sectional view of the electrode assembly embodied in the present invention, the condition of the electrode being shown at the beginning of discharge and the glass beads ordinarily imbedded in the AgCl plate being removed for clarity.
Figure 4A:
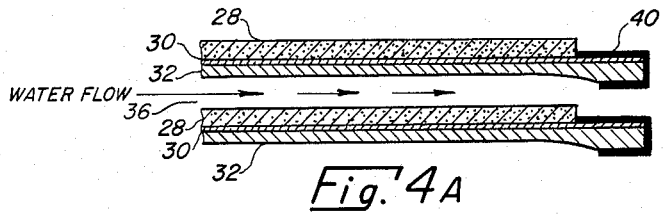
FIG. 4A is the same view as FIG. 4 when the condition of the cell is near the conclusion of discharge.

The details of the battery plates 20 are best seen in FIG. 4. Plate 20 comprises a silver chloride sheet 28 whose surface has been developed to give it a coating of metallic silver, an intermediate silver foil layer 30 and a sheet of magnesium 32. Both the silver foil 30 and magnesium sheet 32 extend laterally beyond the edges of the silver chloride sheet 28. A plurality of beads (not shown) made of glass or other similar non-conductive material are imbedded and distributed over the surface of the silver chloride sheet 28 so that they project outwardly therefrom. These serve to maintain battery plates 20 in spaced relationship at their internal regions thereby forming horizontal channels 36 through which the sea water may circulate.

Silver chloride sheets 28 are also provided with a plurality of holes (not shown) which are cut through from the top to the bottom surface thereof. The surfaces forming these holes are also developed so as to provide layers of silver which electrically connect the upper and lower developed surfaces of the silver chloride plate.

The entire periphery of plate 20 is provided with insulating tape 40 which surrounds both the silver foil layer 30 and the magnesium layer 32. This acts to prevent shorting in the areas near the edges of the plates.

The developed silver chloride sheet serves as the positive plate for a cell of the sea-water batteries whereas the magnesium sheet acts as the negative plate. The silver foil 30 has a dual function both as a separator between the battery cells and as a collector and conveyor for current from the negative plate of one cell (magnesium sheet) to the positive plate of the next cell (silver chloride sheet). External wires or bars for conducting current from one cell to another are done away with.

As will be seen from FIG. 4, the silver chloride plate 28 of each duplex plate is cut back from the edge so that the margin of the silver chloride plate is spaced inwardly of the inner margin of the insulating tape. This arrangement, however, is necessary only at the water flow exit side of the plate since this is the area at which the caking has been observed. Although this distance is not critical, as a practical matter, it has been found suitable to space the silver chloride inwardly of the inner edge insulating tape a distance about 1/8". Although this is only necessary at one side of the plate, if desired, a similar arrangement may be used on the other side of the electrode.

Figure 5:
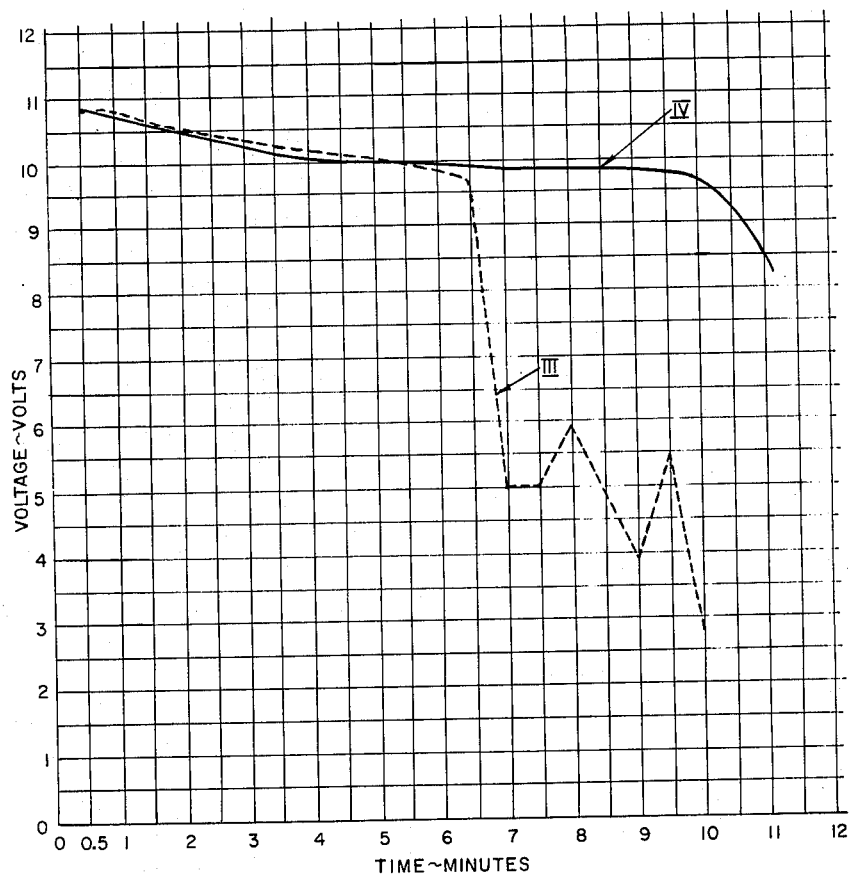
FIG. 5 is a set of discharge curves comparing the performance of a sea-water battery having the electrode assembly shown in FIGS. 3 and 3A with that having the electrode assembly of the present invention depicted in FIGS. 4 and 4A.

The relative performance of the present "cut back" plate construction as compared with the previously suggested construction is shown in FIG. 5. These curves represent discharge curves in which the voltage is plotted against the time. Curve III represents the discharge curve for the prior construction described herein. Curve IV represents the discharge curve for the cut-back construction of this invention.

It will be seen from these curves that in the prior construction, that after about 6.5 minutes of discharge the voltage drop is sharp and the voltage is erratic. In contrast the discharge potential of the present cut-back construction (Curve IV) is more uniform well after 6.5 minutes of discharge.

Other means for preventing the pile up of sludge which would impede the flow of electrolyte through the battery are as follows:

(1) Removal of the binding tape at the exit end of the plate (this will require insulation of the silver chloride on the outer side of the bi-polar plate to avoid discharge).

(2) Deposition of a tape or a suitable paint such as a plastic paint, along the exit edge of the silver chloride plate. This would, in effect, shorten the silver chloride plate.

Whereas the invention has been described with reference to specific forms thereof, it will be understood that many changes and modifications may be made without departing from the spirit of this invention.

What is claimed is:

1. In a primary battery adapted to be activated by the passage of a saline electrolyte therethrough, in combination, a housing; and a stack of spaced-apart bi-polar electrodes in said housing, said stack having an inlet side for the introduction of said electrolyte between said bi-polar electrodes and an outlet side for the escape of said electrolyte, each of said electrodes having first and second active layers of opposite polarity respectively juxtaposed with opposite-polarity layers of adjoining electrodes, said first layer consisting essentially of silver chloride, said second layer having a continuous planar surface opposite that on which said first layer is disposed and confronting the first layer of an adjacent electrode, said second layer consisting essentially of a material selected from the group consisting of magnesium and magnesium alloys, said first layer of each electrode terminating inwardly of the second layer thereof at said outlet side of said stack to define a marginal portion of said second layer at said outlet side, a respective insulating sheath enclosing said marginal portion and underlying said continuous planar surface of said second layer, said sheath having along said surface an inner edge terminating outwardly of the corresponding outer edge of the juxtaposed first layer of an adjoining electrode and a respective foil of silver interposed between said first and second layers while being coextensive with said second layer and having a marginal portion enclosed by said sheath.

2. In a primary battery adapted to be activated by the passage of a saline electrolyte therethrough, in combination, a housing; and a stack of electrodes spaced apart by a distance of about 15 mils in said housing, said stack having an inlet side for the introduction of said electrolyte between said bipolar electrodes and an outlet side for the escape of said electrolyte, each of said electrodes having first and second active layers of opposite polarity respectively juxtaposed with opposite-polarity layers of adjoining electrodes, said second layer having a continuous planar surface opposite that on which said first layer is disposed and confronting the first layer of an adjacent electrode, said first layer consisting essentially of silver chloride, said second layer consisting essentially of a material selected from the group consisting of magnesium and magnesium alloys, said first layer of each electrode terminating inwardly of the second layer thereof at said outlet side of said stack to define a marginal portion of said second layer at said outlet side, a respective insulating sheath of insulating tape having a thickness of about 0.002 inch enclosing said marginal portion and underlying said continuous planar surface of said second layer, said sheath having along said surface an inner edge terminating at least about ⅛ inch outwardly of the corresponding outer edge of the juxtaposed first layer of an adjoining electrode, and a respective foil of silver having a thickness between substantially 0.0005 and 0.001 inch interposed between said first and second layers while being coextensive with said second layer and having a marginal portion enclosed by said sheath.

References Cited by the Examiner
UNITED STATES PATENTS

| | | | |
|---|---|---|---|
| 2,639,306 | 5/1953 | Fischbach | 136—90 |
| 2,716,671 | 8/1955 | Dines | 136—90 |
| 2,971,999 | 2/1961 | Jacquier | 136—111 |
| 2,988,587 | 6/1961 | Haring | 136—90 |
| 3,005,864 | 10/1961 | Sharpe | 136—90 |
| 3,061,659 | 10/1962 | Wilke et al. | 136—90 |
| 3,156,586 | 11/1964 | Solomon et al. | 136—100 |

WINSTON A. DOUGLAS, *Primary Examiner.*

JOHN R. SPECK, *Examiner.*

M. TILLMAN, JOHN H. MACK, H. FEELEY, B. J. OHLENDORF, *Assistant Examiners.*